United States Patent [19]
Janiszewski

[11] Patent Number: 5,906,132
[45] Date of Patent: *May 25, 1999

[54] MOTOR VEHICLE GEARBOX

[75] Inventor: Grzegorz Janiszewski, Angered, Sweden

[73] Assignee: AB Volvo, Gothenburg, Sweden

[ * ] Notice: This patent is subject to a terminal disclaimer.

[21] Appl. No.: 08/765,615

[22] PCT Filed: Mar. 3, 1995

[86] PCT No.: PCT/SE95/00226

§ 371 Date: Dec. 26, 1996

§ 102(e) Date: Dec. 26, 1996

[87] PCT Pub. No.: WO96/00863

PCT Pub. Date: Jan. 11, 1996

[30] Foreign Application Priority Data

Jun. 29, 1994 [SE] Sweden ................................. 9402302

[51] Int. Cl.⁶ ...................................................... F16H 3/08
[52] U.S. Cl. ................................................. 74/331; 74/359
[58] Field of Search ............................... 74/331, 359, 329

[56] References Cited

U.S. PATENT DOCUMENTS

| 3,080,767 | 3/1963 | Price .................................... 74/331 X |
| 3,318,167 | 5/1967 | Frost . |
| 3,589,483 | 6/1971 | Smith .................................... 74/331 X |
| 4,549,443 | 10/1985 | White .................................... 74/331 X |
| 4,570,503 | 2/1986 | Theobald .............................. 74/331 X |
| 4,662,242 | 5/1987 | Atkinson et al. ...................... 74/359 X |
| 4,667,526 | 5/1987 | Young ........................................ 74/331 |
| 5,311,789 | 5/1994 | Henzler et al. . |
| 5,385,065 | 1/1995 | Hofmann ................................. 74/331 |
| 5,715,727 | 2/1998 | Janiszewski .......................... 74/331 X |

FOREIGN PATENT DOCUMENTS

| 0 545 102 | 6/1993 | European Pat. Off. . |
| 0 560 202 | 9/1993 | European Pat. Off. . |
| 41 16 189 | 11/1991 | Germany . |

*Primary Examiner*—Richard M. Lorence
*Assistant Examiner*—Scott Lund
*Attorney, Agent, or Firm*—Young & Thompson

[57] ABSTRACT

Motor vehicle gearbox, comprising an input shaft (2) and two countershafts (3, 4) having six pairs of interengaging gears (7–11, 15, 16, 17–20) for first to sixth gear. The disengageable gear (17) for the first gear speed engages a disengageable gear (23) on the fourth shaft (5) for reverse.

3 Claims, 3 Drawing Sheets

MOTOR VEHICLE GEARBOX

This invention is related to International Application PCT/SE95/00226 filed Mar. 3, 1995, entitled "Motor Vehicle Gearbox".

BACKGROUND OF THE INVENTION

The present invention relates to a motor vehicle gearbox comprising a housing with an input shaft and two countershafts lying in a plane offset from the input shaft and having gears in engagement with gears on the input shaft, at least one gear of each pair of mutually engaging gears on said shafts being disengageable from its shaft, one of said disengageable gears being mounted on one countershaft and being disposed to transmit torque in the first gear speed to a final drive unit.

DESCRIPTION OF THE RELATED ART

A gearbox of the above described type is known, for example, by SE-A-8601247-3. It has five gear speeds forward and one reverse. The torque is transmitted in reverse from the input shaft via one countershaft to the other countershaft. In this way, the need for a separate shaft for the idler gear for reverse is eliminated. Instead, the first mentioned countershaft is used as a reverse gear shaft. This provides a particularly compact, simple and inexpensive design, which, with its axially small dimensions is particularly suited for use together with transverse engines.

SUMMARY OF THE INVENTION

The purpose of the present invention, starting from the above described gearbox, is to achieve a gearbox, which in a five-speed version can be made even shorter, and, in a six-speed version, will be as short as the known five-speed gearbox.

This is achieved according to the invention by virtue of the fact that the input shaft has at least five gears in engagement with gears on the countershafts for transferring torque to the final drive unit for forward drive with at least five different gear ratios, and that the disengageable gear for transmitting torque in the first gear speed engages an additional gear which is disengageably carried on a fourth shaft and is disposed to transmit reversing torque to the final drive unit.

In a six-speed embodiment of the gearbox according to the invention, the input shaft has six gears in engagement with gears on the countershafts.

In this embodiment, a disengageable gear for the sixth gear speed can assume the place taken by the reverse disengageable gear in a five-speed gearbox, and the reverse disengageable gear can instead be carried by an extra shaft. In comparison with the above mentioned known five-speed gearbox, one gear is eliminated in the drive train in reverse by virtue of the fact that the reverse disengageable gear on the fourth shaft engages directly the disengageable gear for the first gear speed and now, as in the known design, a gear solidly joined to the hub of the disengageable gear for the first gear speed. This also provides optimally small masses to be synchronized and a suitable gear lever shift pattern is obtained.

BRIEF DESCRIPTION OF THE DRAWINGS

The invention will be described in more detail below with reference to examples shown in the accompanying drawing, where FIG. 4 shows the shift lever shift pattern.

DESCRIPTION OF THE PREFERRED EMBODIMENTS

Figure 1:
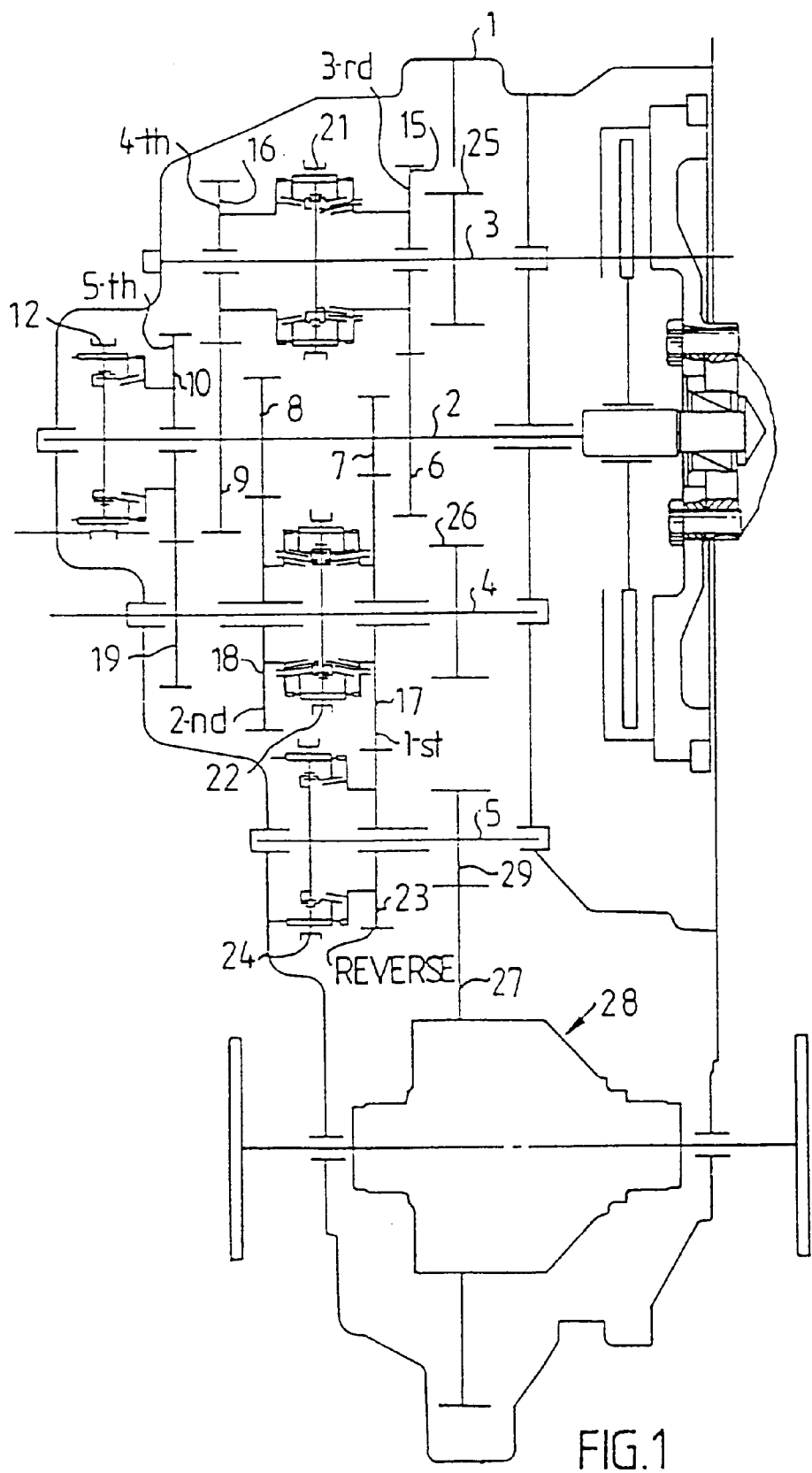
FIG. 1 shows a schematic longitudinal section through a five-speed gearbox according to the invention.

In a gearbox housing generally designated 1, which also forms the housing for the clutch, an input shaft 2, a first countershaft 3, a second countershaft 4, and a reverse gear shaft 5 are rotatably mounted. The input shaft 2 has five gears 6, 7, 8, 9, 10 (FIG. 1), of which the gear 6, 7, 8 and 9 are non-rotatably fixed, while the gear 10 is a disengageable gear, i.e. it is rotatably mounted on the shaft 2 and can be locked in a conventional manner by means of an engaging sleeve 12 with associated synchronizing means. The countershafts have gear 15, 16, 17, 18, 19 (FIG. 1), of which the gears 15, 16, 17 and 18 are disengageable, being locked to their shafts by means of engaging sleeves 21 or 22 with associated synchronizing means. The reverse gear shaft 5 has a disengageable gear 23, which can be locked to the shaft by means of an engaging sleeve 24 with associated synchronizing means.

On the intermediate shafts 3 and 4, a pair of gears 25 and 26 of equal size are non-rotatably fixed, and engage the crown-wheel 27 of a final drive unit, generally designated 28, in the form of a differential. A gear 29 is non-rotatably fixed to the reverse shaft 5. The gear 29 has a somewhat smaller diameter than the gears 25 and 26 and also engages the crown-wheel 27 of the final drive unit 28.

It is evident from FIGS. 1 and 2 which gears engage each other in the respective gear speeds; only the torque transmission in the first gear speed and in reverse will be described in detail here. With the gear 15 locked to the countershaft 4 by means of the engaging sleeve 22 and with the other disengageable gears disengaged, the highest gear ratio is obtained for forward drive, i.e. first gear. When shifting from first to reverse, the gear 17 is disengaged and the reversing gear 23 is instead engaged by means of the engaging sleeve 24, and the disengageable gear 17 for the first gear speed, which engages the reverse gear 23, serves as an idler gear to impart to the reverse shaft 5 a direction of rotation opposite to the rotational direction of the countershafts 3, 4 when driving forward.

By placing the reverse gear 23 on a fourth shaft 5, the five-speed gearbox can be made even shorter than the very shortest known five-speed gearbox.

Figure 2:
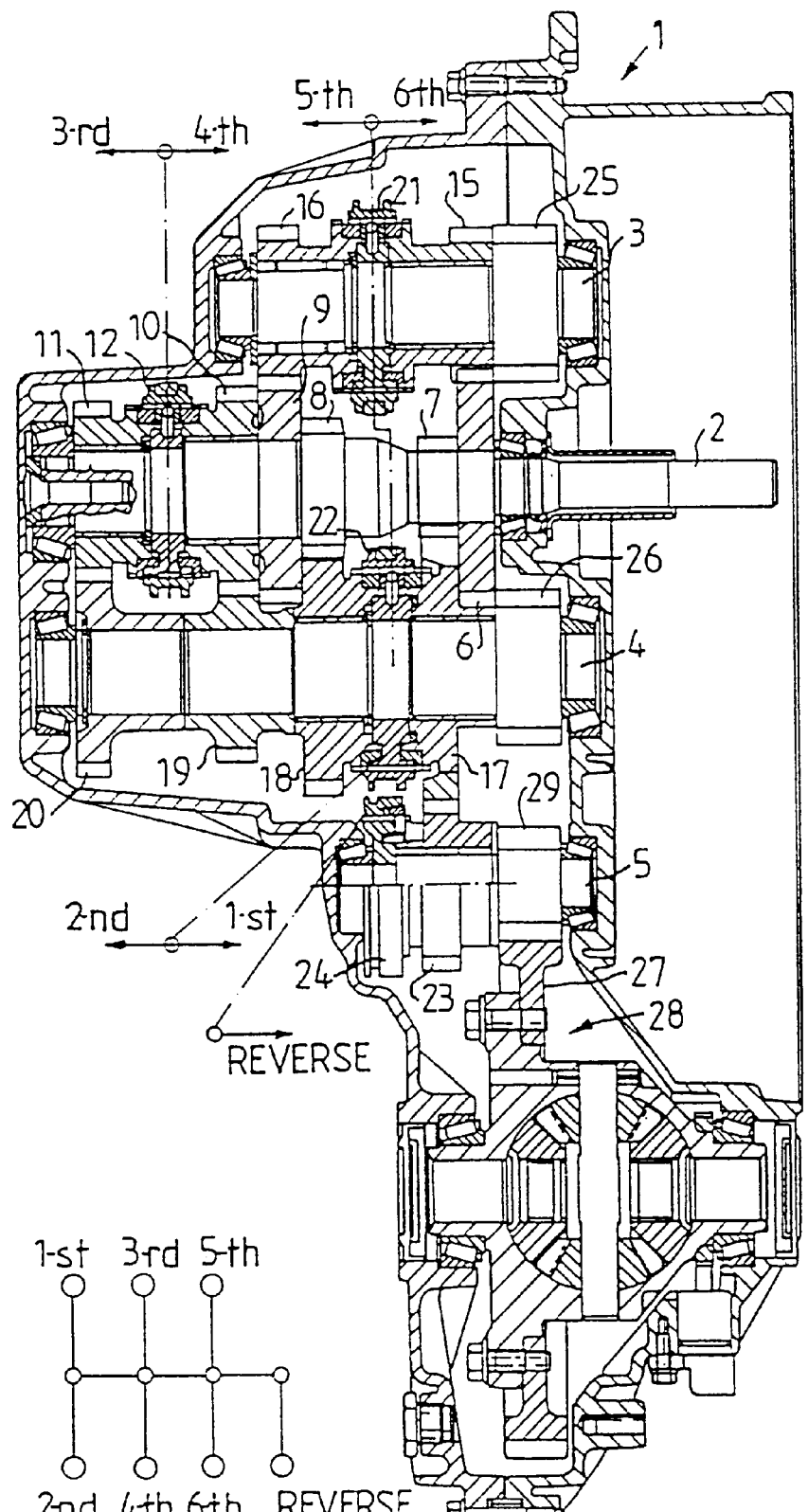
FIG. 2 is a longitudinal section through one embodiment of a six-speed gearbox according to the invention.
Figure 3:
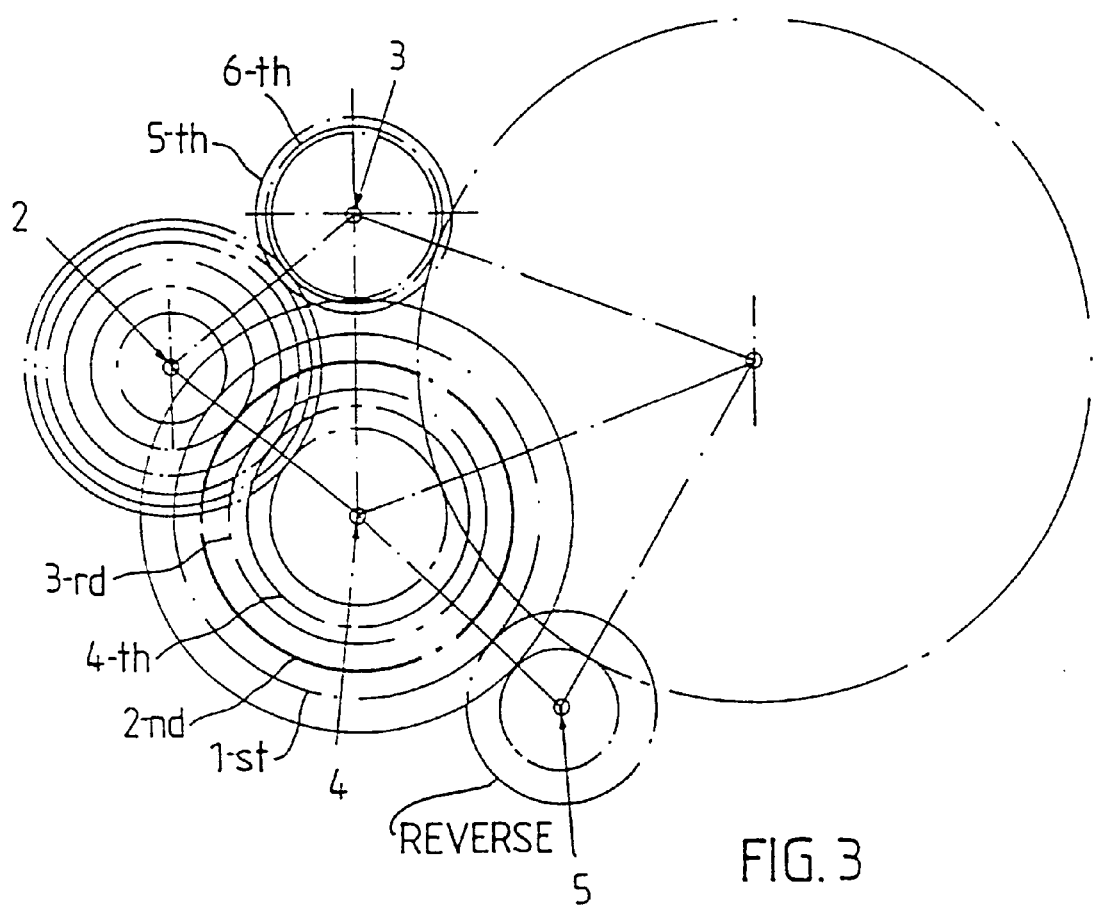
FIG. 3 is a schematic end view of the gearbox shown in FIG. 2.

A six-speed embodiment of the gearbox according to the invention, which is shown in FIG. 2 and which will be described below, can be achieved by building onto the five-speed gearbox. The length of the six-speed gearbox does not need to exceed the length of the shortest known five-speed gearbox. In FIG. 2, all of the components with counterparts in FIG. 1 have been given the same reference numerals as in FIG. 1. Differences in size between the disengageable gears and the gears for the gear speeds 1–5 and reverse, which result in differences in gear ratios between the two types, will not be regarded here.

The gearbox shown in FIG. 2 has a somewhat longer input shaft 2 and countershaft 4 than the gearbox in FIG. 1. A gear 11 is freely rotatably mounted on the extension of the input shaft 2. Said gear 11 is lockable onto the shaft by means of the same engaging sleeve 12 which locks the gear 10. Via the engaged gear 11 and a gear 20 fixed to an extension of the countershaft 4 as well as the gear 26, torque is transmitted in the third gear speed. In this example, the gear 10 transmits torque in the fourth gear speed. Torque in fifth and sixth gear speed is transmitted by the disengageable gears 16 and 15, respectively, on the countershaft 3.

The invention has been described above with reference to preferred embodiments for a transverse engine, but the principle of the invention can of course also be applied to a gearbox for a longitudinally mounted engine. An advantage of using the disengageable gear 17 for the first gear speed as an intermediate gear for reverse is that a high gear ratio is obtained. The same gears are also used for those gear speeds (first and reverse) on which the same requirements are placed as regards torque, gear ratio, noise level etc.

I claim:

1. Motor vehicle gearbox comprising a housing with an input shaft and two countershafts lying in a plane offset from the input shaft and having gears in engagement with gears on the input shaft, at least one gear of each pair of mutually engaging gears on said shafts being disengageable from its shaft, one of said disengageable gears being mounted on one countershaft and being disposed to transmit torque in a first gear speed to a final drive unit, wherein the input shaft (2) has at least five gears (7–11) in engagement with gears (15, 16, 17–20) on the countershafts (3, 4) for transferring torque to the final drive unit for forward drive with at least five different gear ratios and wherein each of said at least five gears on the input shaft meshes with only one of said gears on only one of the countershafts, so that only one power path is provided for each of said at least five different gear ratios, and wherein the one of said disengageable gears (17) for transmitting torque in the first gear speed engages an additional gear (23), which is disengageably carried on a fourth shaft (5) and is disposed to transmit reversing torque to the final drive unit (28) and wherein the countershafts (3, 4) and the fourth shaft (5) have final drive gears (25, 26, 29) non-rotatably joined to their respective shafts, each of said final drive gears engaging a crown wheel (27) of a differential (28).

2. Gearbox according to claim 1, characterized in that the input shaft (2) and the countershafts (3, 4) have six pairs of interengaging gears (7–11, 15, 17–20) for transmitting torque in a first to a sixth gear speed.

3. Gearbox according to claim 1, wherein the additional gear (23) on the fourth shaft (5) can be locked to the fourth shaft by means of an engaging device (24) with synchronizing means.

* * * * *